United States Patent
Birsching

(10) Patent No.: US 8,862,324 B2
(45) Date of Patent: Oct. 14, 2014

(54) DAMPING METHODS AND SYSTEMS FOR ELECTRIC POWER STEERING

(75) Inventor: Joel E. Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 76 days.

(21) Appl. No.: 13/357,162

(22) Filed: Jan. 24, 2012

(65) Prior Publication Data

US 2012/0232755 A1    Sep. 13, 2012

Related U.S. Application Data

(60) Provisional application No. 61/449,916, filed on Mar. 7, 2011.

(51) Int. Cl.
*B62D 5/04* (2006.01)
*B62D 6/08* (2006.01)

(52) U.S. Cl.
CPC .................................. *B62D 5/0463* (2013.01)
USPC ............................................ 701/41; 180/446

(58) Field of Classification Search
USPC ..................... 701/41; 180/443, 466
See application file for complete search history.

(56) References Cited

U.S. PATENT DOCUMENTS

| | | | |
|---|---|---|---|
| 6,122,579 A * | 9/2000 | Collier-Hallman et al. | 701/41 |
| 6,131,693 A * | 10/2000 | Mukai et al. | 180/446 |
| 6,161,068 A * | 12/2000 | Kurishige et al. | 701/41 |
| 6,459,971 B1 * | 10/2002 | Kurishige et al. | 701/41 |
| 7,099,759 B2 * | 8/2006 | Ghoneim | 701/41 |
| 7,751,960 B2 * | 7/2010 | Zhang et al. | 701/41 |
| 7,920,946 B2 * | 4/2011 | Champagne | 701/41 |
| 7,983,815 B2 * | 7/2011 | Kurishige et al. | 701/41 |
| 7,996,130 B2 * | 8/2011 | Zhang et al. | 701/42 |
| 8,019,507 B2 * | 9/2011 | Kurishige et al. | 701/41 |
| 8,103,411 B2 * | 1/2012 | Wijffels et al. | 701/42 |
| 8,434,583 B2 * | 5/2013 | Wilson-Jones et al. | 180/443 |
| 2005/0222731 A1* | 10/2005 | Ghoneim | 701/41 |
| 2006/0106516 A1* | 5/2006 | Pick et al. | 701/41 |
| 2010/0235047 A1* | 9/2010 | Kurishige et al. | 701/41 |
| 2010/0268418 A1* | 10/2010 | Fernandez et al. | 701/41 |
| 2010/0292896 A1* | 11/2010 | Watanabe et al. | 701/41 |
| 2011/0071729 A1* | 3/2011 | Oblizajek et al. | 701/41 |
| 2011/0093167 A1* | 4/2011 | Williams et al. | 701/41 |
| 2012/0006612 A1* | 1/2012 | Wilson-Jones et al. | 180/446 |
| 2012/0072074 A1* | 3/2012 | Greul et al. | 701/41 |
| 2012/0209475 A1* | 8/2012 | Birsching et al. | 701/42 |
| 2013/0066520 A1* | 3/2013 | Hales et al. | 701/41 |

FOREIGN PATENT DOCUMENTS

| | | | | |
|---|---|---|---|---|
| EP | 1764284 | * | 9/2005 | |
| JP | 2003312520 A | * | 11/2003 | B62D 6/00 |
| WO | WO03086839 | * | 9/2002 | |

OTHER PUBLICATIONS

China Patent Application No. 201210096918.1 First Office Action dated Mar. 5, 2014, 6 pages.

* cited by examiner

*Primary Examiner* — John R Olszewski
*Assistant Examiner* — Jean-Paul Cass
(74) *Attorney, Agent, or Firm* — Cantor Colburn LLP

(57) ABSTRACT

A control system for controlling an electric power steering system is provided. The control system includes a first module that estimates a damping force based on an assist torque and a handwheel velocity. A second module generates a control signal based on the estimated damping force.

15 Claims, 4 Drawing Sheets

DAMPING METHODS AND SYSTEMS FOR ELECTRIC POWER STEERING

CROSS-REFERENCES TO RELATED APPLICATIONS

This patent application claims priority to U.S. Provisional Patent Application Ser. No. 61/449,916 filed Mar. 7, 2011 which is incorporated herein by reference in its entirety.

BACKGROUND OF THE INVENTION

The present invention relates to methods and systems for controlling a steering system, and more particularly to methods and system for determining a damping and controlling the steering system based on the damping.

In a hydraulic assisted power steering system, a pump provides a constant flow (Qs) to an open center valve assembly that controls the level of assist pressure to the system based on the driver torque applied to the valve. The assist is communicated to the hydraulic cylinder through a pair of cylinder lines. This creates a differential pressure (PH-PL) across a piston attached to a rack to generate a force (F) at the tie rods to steer the vehicle.

In the static condition, the supply flow ($Q_S$) will divide through the valve assembly across the metering edges of the valve to achieve equilibrium, as shown in FIG. 1A. When the rack moves, however, a flow ($Q_L$) is required in the cylinder lines to accommodate the volume changes in the cylinder as shown in FIG. 1B. This in turn reduces the flow across the metering edges in the valve, which changes the amount of assist generated in the system. This has the effect of providing damping in the hydraulic system.

Accordingly, it is desirable to provide control methods and systems for electric power steering systems that provide and/or mimic damping in a similar manner as the hydraulic systems.

SUMMARY OF THE INVENTION

These and other advantages and features will become more apparent from the following description taken in conjunction with the drawings.

In one embodiment, a control system for controlling an electric power steering system is provided. The control system includes a first module that estimates a damping force based on an assist torque and a handwheel velocity. A second module generates a control signal based on the estimated damping force.

In another embodiment, a method of controlling an electric power steering system is provided. The method comprises estimating a damping force based on a steering assist torque and a handwheel velocity, and generating a control signal based on the estimated damping force.

In yet another embodiment, a system is provided. The system comprises an electric power steering system. A control module estimates a damping force based on an assist torque and a handwheel velocity, and generates a control signal to the electric power steering system based on the estimated damping force.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1B:
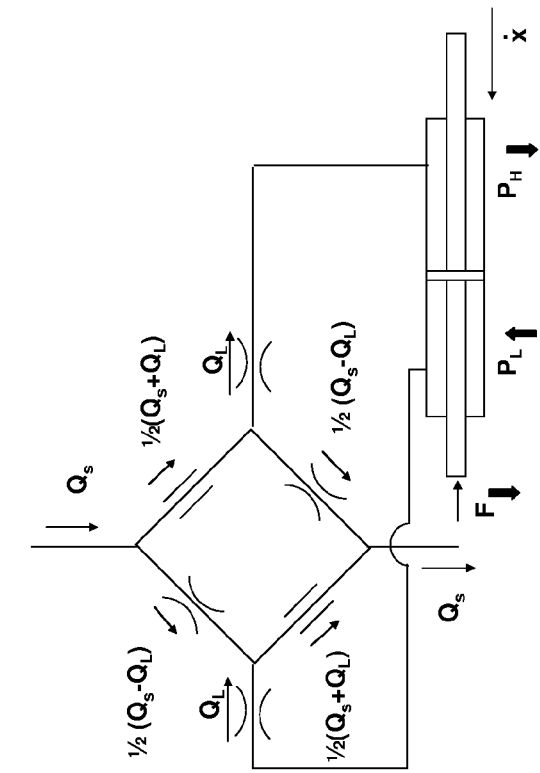
FIGS. 1A and 1B are functional block diagrams illustrating a hydraulic steering system in accordance with the prior art.

The following description is merely exemplary in nature and is not intended to limit the present disclosure, application, or uses. It should be understood that throughout the drawings, corresponding reference numerals indicate like or corresponding parts and features.

Figure 2:
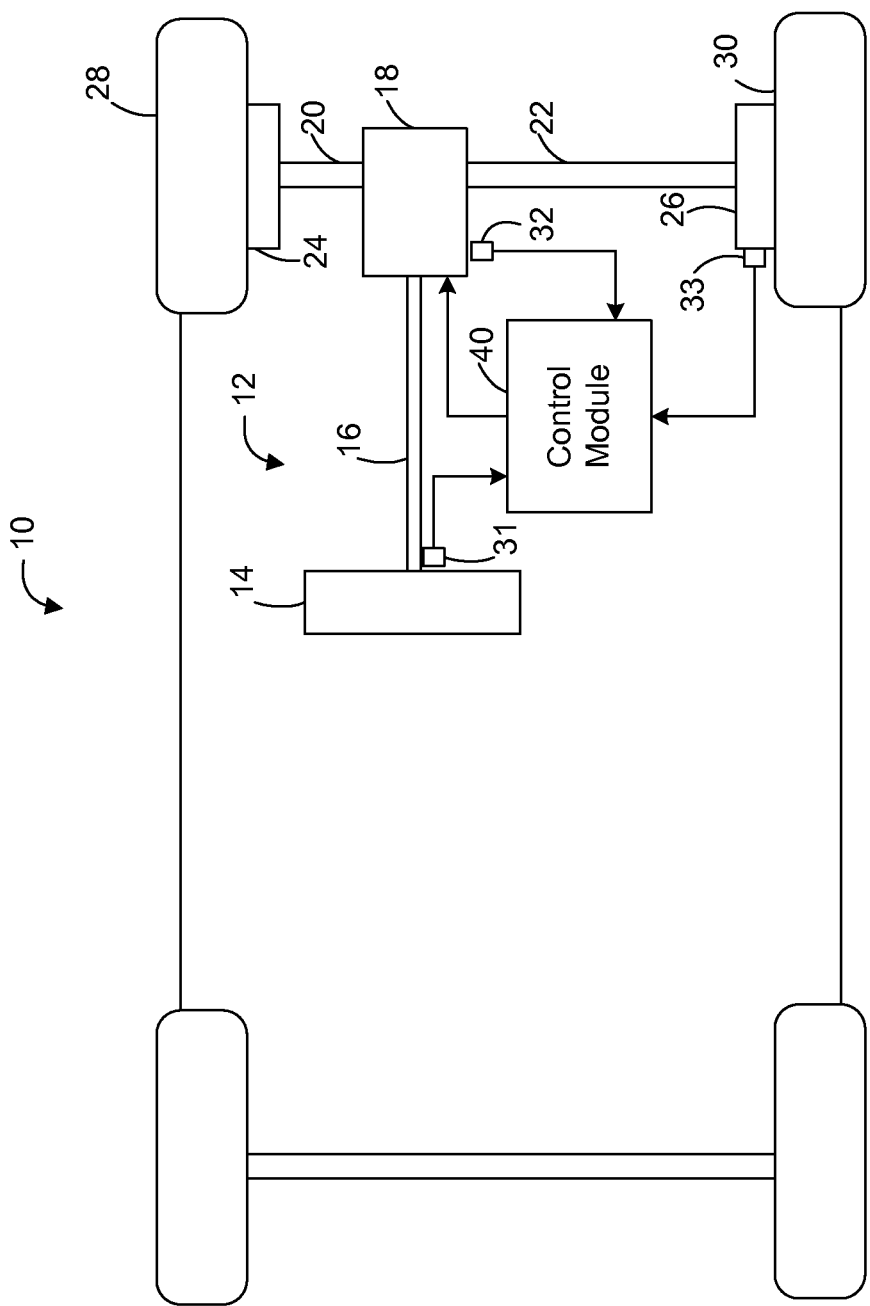
FIG. 2 is a functional block diagram illustrating a vehicle including an electric power steering control system in accordance with an exemplary embodiment of the invention.

Referring now to FIG. 2, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 2, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses the torque applied to the handwheel 14 by the operator of the vehicle 10. The torque sensor generates a driver torque signal based thereon. In another example, the sensor 32 is a motor speed sensor that senses a rotational speed of the motor of the steering assist unit. The sensor 32 generates a speed or velocity signal based thereon. In yet another example, the sensor 33 is a vehicle speed sensor that senses a rotational speed of the wheel 30. The sensor 33 generates a vehicle speed signal based thereon.

A control module 40 controls the operation of the steering system 12 based on one or more of the sensor signals and further based on the steering control systems and methods of the present disclosure. Generally speaking, the steering control systems and methods of the present estimate a damping value based on damping characteristics that are found in a hydraulic steering system.

Figure 1A:
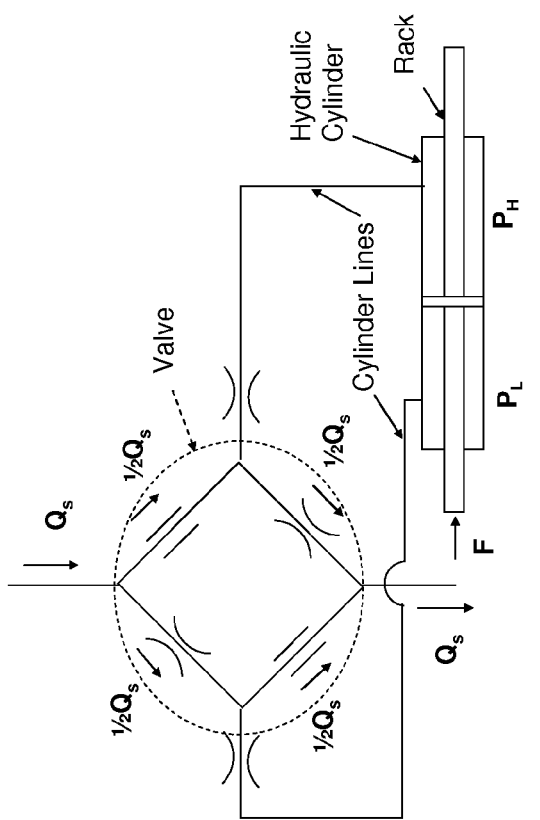

For example with reference to FIGS. 1A and 1B, in hydraulic systems, the damping force can be provided by two means. The first is a result of a pressure drop generated by the flow ($Q_L$) through the cylinder lines. This effect is based on the velocity of the rack alone. The second effect is a result of the pressure drop due to the drop in flow across the metering edges of the valve assembly. This effect is based on the velocity and the amount of assist being generated.

Taking into account these characteristics of the hydraulic system, the damping force (DF) for an electric power steering system can be estimated by the following equation:

$$DF=V(C1+|AP|*C3)+V^2(C2*sgn(V)-AP*C4). \quad (1)$$

C1, C2, C3, and C4 represent constant parameters. V represents handwheel velocity. AP represents the assist force or torque.

The steering control systems and methods of the present disclosure generate signals to control the steering system based on the estimated damping force.

Figure 3:
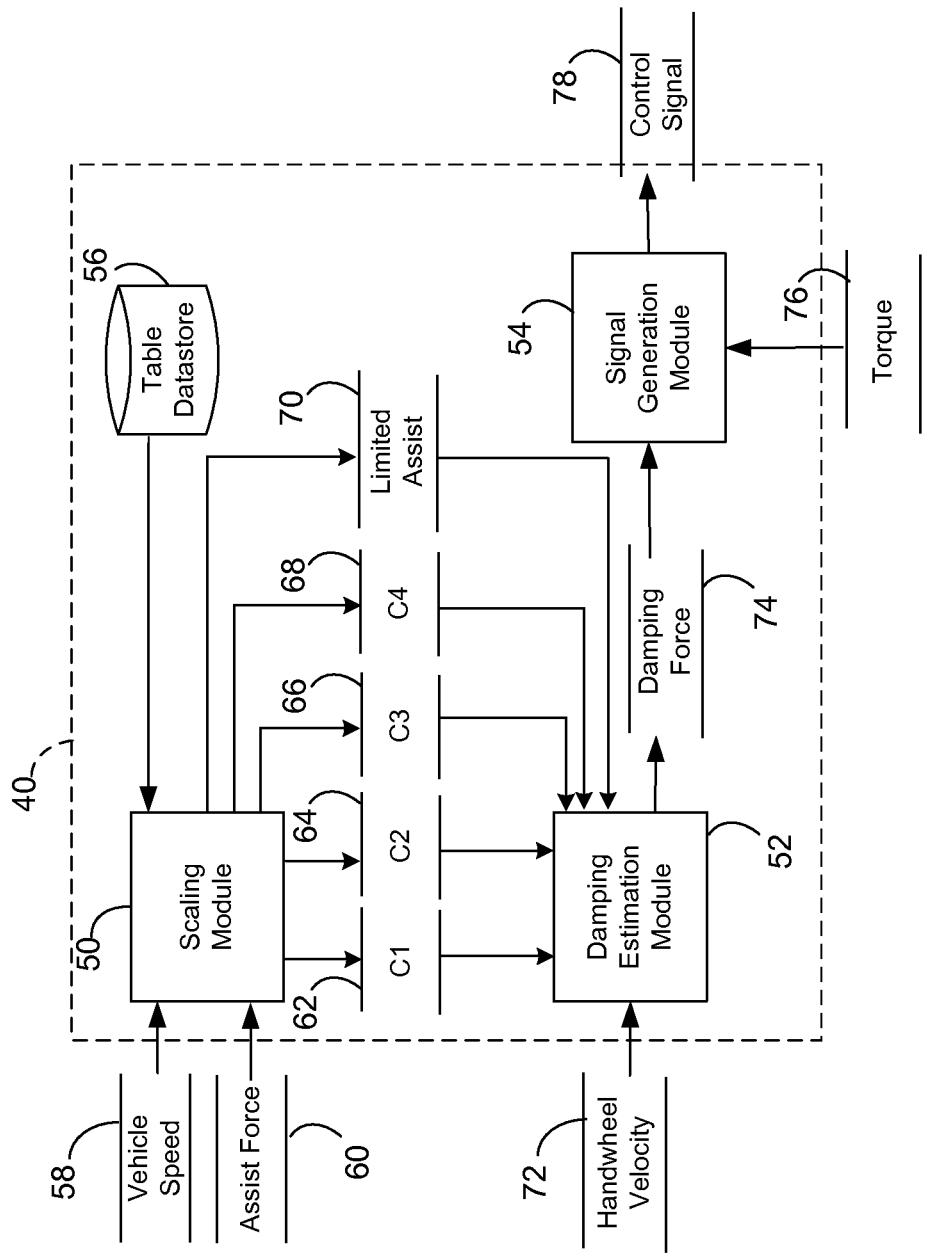
FIG. 3 is a dataflow diagram illustrating an electric power steering control system in accordance with another exemplary embodiment of the invention.

Referring now to FIG. 3, a dataflow diagram illustrates an exemplary embodiment of the control module 40 of FIG. 2 used to control the steering system 12 of FIG. 2. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly determine a damping value and to control the steering system 12 based thereon. Inputs to the control module 40 can be generated from the sensors 31, 32, 33 (FIG. 2) of the vehicle 10 (FIG. 2), can be received from other control modules (not shown) within the vehicle 10 (FIG. 2), can be modeled, and/or can be predefined. In one example, the control module 40 includes a scaling module 50, a damping estimation module 52, a signal generation module 54, and a table datastore 56.

The scaling module 50 receives as input vehicle speed 58 and assist force or torque 60. As can be appreciated, the assist force or torque 60 can be estimated based on one or more sensor inputs and according to one or more force or torque estimation methods known in the art.

The scaling module 50 determines the parameters (C1, C2, C3, and C4) 62-68 to be used in the damping estimation. In various embodiments, the parameters 62-68 can be predefined and can be scaled based on vehicle speed 58. For example, a table of scale factors can be accessed from the table datastore 56 for each parameter 62-68. Each table can be based on vehicle speed 58. The predefined parameter factor is then multiplied by the scale factor.

In various embodiments, the scaling module 50 limits the magnitude of the assist force or torque 60 used in the computation of the damping force to a value at or below a predetermined threshold and generates a limited assist torque or force 70. The limit can be based on vehicle speed 58. For example, a table of scale factors can be accessed from the table datastore 56. A limit factor can be determined from the vehicle speed. The limit factor can be used to limit a value of the assist torque or force used to determine the damping force at high magnitude values.

The damping estimation module receives as input the scaled parameters C1, C2, C3, C4 62-68, the limited assist torque or force 70, and handwheel velocity 72. The damping estimation module 52 estimates a damping force 74 based on the inputs. The damping estimation module estimates the damping force 74 using, for example, equation 1.

The signal generation module 54 receives as input the damping force 74 and, optionally, other torque values 76. As can be appreciated the other torque values 76 can be sensed and/or determined based on one or more torque determination methods and/or can include, for example, the assist torque or force 60. The signal generation module 54 generates a control signal 78 to control the steering system 12 (FIG. 2) based on the damping force 74 and other torque values 76.

Figure 4:
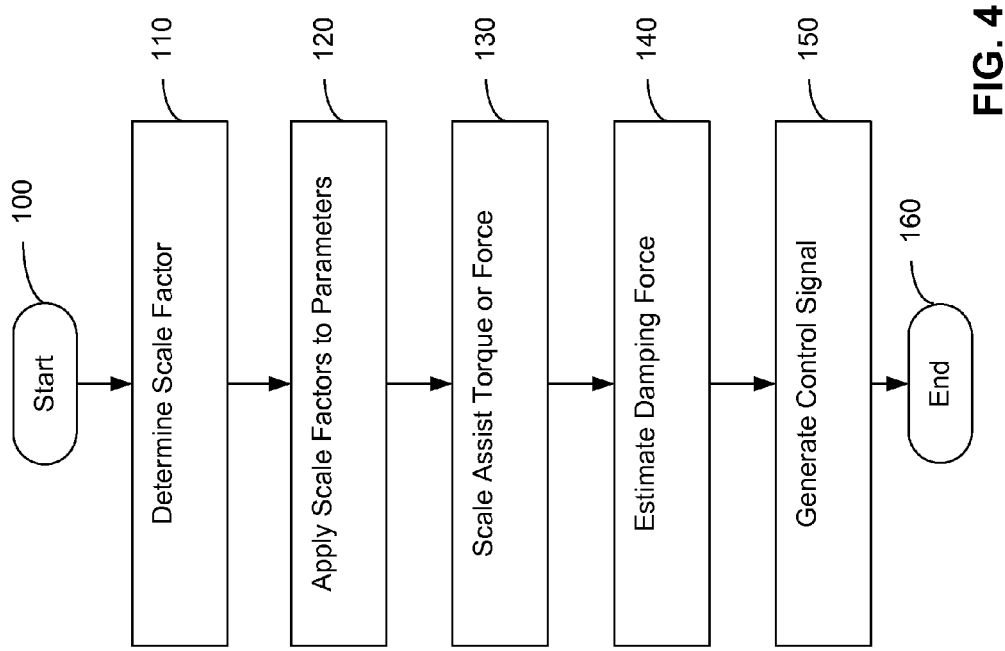
FIG. 4 is a model illustrating exemplary electric power steering control methods and systems in accordance with yet other exemplary embodiments of the invention.

Referring now to FIG. 4 and with continued reference to FIG. 3, a flowchart illustrates a damping estimation method that can be performed by the control module 40 of FIG. 2. As can be appreciated in light of the disclosure, the order of operation within the method is not limited to the sequential execution as illustrated in FIG. 4, but may be performed in one or more varying orders as applicable and in accordance with the present disclosure.

As can be appreciated, the damping estimation method can be scheduled to run based on predetermined events and/or can run at scheduled intervals during operation of the steering system 12 (FIG. 1).

In one example, the method may begin at 100. The scale factors are determined for each parameter 62-68 at 110, for example, based on the vehicle speed 58 as discussed above. The scale factor is applied to the parameters 62-68 at 120. The assist torque or force is scaled as discussed above at 130. The damping force 74 is determined based on the scaled parameters 62-68 and the limited assist torque or force 70 at 140. The control signals 78 are generated based on the damping force 74 at 150. Thereafter, the method may end at 160.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for controlling an electric power steering system, the control system comprising:
    a first module that estimates a damping force based on an assist torque and a handwheel velocity as a summation of a first term, a second term, a third term, and a fourth term, the first term based on the handwheel velocity, the second term based on a product of the absolute value of the assist torque and the handwheel velocity, the third term based on the handwheel velocity squared and having a same sign as the handwheel velocity, and the fourth term based on a product of the handwheel velocity squared and a negative value of the assist torque, thereby providing an asymmetrical damping characteristic for an assist torque component of the estimated damping force; and
    a second module that generates a control signal based on the estimated damping force.

2. The system of claim 1, wherein the first module estimates the damping force based on a plurality of parameters.

3. The system of claim 2, further comprising a third module that scales the plurality of parameters, and wherein the first module estimates the damping force based on the scaled plurality of parameters.

4. The system of claim 3, wherein the third module scales the plurality of parameters based on a vehicle speed.

5. The system of claim 1, further comprising a third module that limits the assist torque or force, and wherein the first module estimates the damping force based on the limited assist torque or force.

6. A method of controlling an electric power steering system, the method comprising:
    receiving a steering assist torque and a handwheel velocity at a control module of the electric power steering system;
    estimating, by a first module of the control module of the electric power steering system, a damping force based on the steering assist torque and the handwheel velocity as a summation of a first term, a second term, a third term, and a fourth term, the first term based on the handwheel velocity, the second term based on a product of the absolute value of the steering assist torque and the handwheel velocity, the third term based on the handwheel velocity squared and having a same sign as the handwheel velocity, and the fourth term based on a product of the handwheel velocity squared and a negative value of the steering assist torque, thereby providing an asymmetrical damping characteristic for a steering assist torque component of the estimated damping force; and
    generating, by a second module of the control module of the electric power steering system, a control signal based on the estimated damping force.

7. The method of claim 6, wherein the estimating the damping force is based on a plurality of parameters.

8. The method of claim 7, further comprising scaling the plurality of parameters, and wherein the estimating the damping force is based on the scaled plurality of parameters.

9. The method of claim 8, wherein the scaling the plurality of parameters is based on a vehicle speed.

10. The method of claim 6, wherein the estimating the damping force is based on a limited value of assist torque or force.

11. A system, comprising:
    an electric power steering system; and
    a control module that estimates a damping force based on assist torque or force and handwheel velocity as a summation of a first term, a second term, a third term, and a fourth term, the first term based on the handwheel velocity, the second term based on a product of the absolute value of the assist torque and the handwheel velocity, the third term based on the handwheel velocity squared and having a same sign as the handwheel velocity, and the fourth term based on a product of the handwheel velocity squared and a negative value of the assist torque, thereby providing an asymmetrical damping characteristic for an assist torque component of the estimated damping force, and that generates a control signal to the electric power steering system based on the estimated damping force.

12. The system of claim 11, wherein the control module estimates the damping force based on a plurality of parameters.

13. The system of claim 12, wherein the control module scales the plurality of parameters, and estimates the damping force based on the scaled plurality of parameters.

14. The system of claim 13, wherein the control module scales the plurality of parameters based on vehicle speed.

15. The system of claim 11, wherein the control module estimates the damping force based on a limited value of the assist torque.

* * * * *